(12) United States Patent
Zander et al.

(10) Patent No.: US 12,341,640 B2
(45) Date of Patent: Jun. 24, 2025

(54) METHODS FOR REFERENCE SIGNALLING, TRANSMITTER NODES AND RECEIVER NODES

(71) Applicant: Sony Group Corporation, Tokyo (JP)

(72) Inventors: Olof Zander, Södra Sandby (SE); Erik Bengtsson, Eslöv (SE); Fredrik Rusek, Eslöv (SE); Kun Zhao, Malmö (SE); Jose Flordelis, Lund (SE)

(73) Assignee: SONY CORPORATION, Tokyo (JP)

( * ) Notice: Subject to any disclaimer, the term of this patent is extended or adjusted under 35 U.S.C. 154(b) by 361 days.

(21) Appl. No.: 17/908,214

(22) PCT Filed: Mar. 2, 2021

(86) PCT No.: PCT/EP2021/055170
§ 371 (c)(1),
(2) Date: Aug. 30, 2022

(87) PCT Pub. No.: WO2021/197742
PCT Pub. Date: Oct. 7, 2021

(65) Prior Publication Data
US 2023/0127082 A1    Apr. 27, 2023

(30) Foreign Application Priority Data
Mar. 31, 2020 (SE) .................... 2050364-5

(51) Int. Cl.
*H04L 27/26* (2006.01)
(52) U.S. Cl.
CPC ...... *H04L 27/2613* (2013.01); *H04L 27/2605* (2013.01)

(58) Field of Classification Search
None
See application file for complete search history.

(56) References Cited

U.S. PATENT DOCUMENTS

| 6,842,487 B1 | 1/2005 | Larsson |
| 2011/0228737 A1 | 9/2011 | Lee |

(Continued)

FOREIGN PATENT DOCUMENTS

| CN | 110024343 A | 7/2019 |
| CN | 110892769 A | 3/2020 |

(Continued)

OTHER PUBLICATIONS

International Search Report from corresponding International Application No. PCT/EP2021/055170, mailed on May 26, 2021, 3 pages.

(Continued)

*Primary Examiner* — Jason E Mattis
*Assistant Examiner* — Bao G Nguyen
(74) *Attorney, Agent, or Firm* — Tucker Ellis LLP

(57) ABSTRACT

Disclosed is a method performed by a transmitter node of a communication system, for transmitting reference signalling. The method comprises transmitting, to one or more receiver nodes of the communication system, a reference signal sequence using a first antenna port and a carrier frequency. The method comprises transmitting, to the one or more receiver nodes, using another antenna port and the same carrier frequency, a delayed version of the reference signal sequence. The delay is non-zero and less than a symbol duration of the communication system.

20 Claims, 6 Drawing Sheets

(56) References Cited

U.S. PATENT DOCUMENTS

| | | | |
|---|---|---|---|
| 2016/0337672 A1* | 11/2016 | Lee | H04L 1/004 |
| 2017/0279502 A1 | 9/2017 | Kim | |
| 2018/0302245 A1* | 10/2018 | Oh | H04L 27/2613 |
| 2020/0021470 A1* | 1/2020 | Sun | H04L 25/02 |
| 2020/0177207 A1* | 6/2020 | Motozuka | H04L 1/0041 |
| 2023/0027976 A1* | 1/2023 | Park | H04B 17/309 |
| 2024/0049139 A1* | 2/2024 | Jansson | H04W 52/0254 |

FOREIGN PATENT DOCUMENTS

| | | | |
|---|---|---|---|
| JP | 2004297142 A | 10/2004 | |
| JP | 2007082189 A | 3/2007 | |
| NO | 0225857 A1 | 3/2002 | |
| WO | WO-2009075104 A1 | 6/2009 | |
| WO | WO-2018045028 A1 | 3/2018 | |
| WO | WO-2018101863 A1 | 6/2018 | |

OTHER PUBLICATIONS

Gunther Auer, "Channel estimation for OFDM with cyclic delay diversity", IEEE International Symposium, dated Sep. 5, 2004, 5 pages.
Office Action and Search Report from corresponding Swedish Application No. 2050364-5, mailed on Nov. 10, 2020, 10 pages.
LG Electronics, "NR-PBCH Design", 3GPP TSG-RAN WG1; Meeting #89, R1-1707590, May 15-19, 2017, 14 pages.
Sony Corp., "On UE Beam Correspondence", 3GPP TSG-RAN WG4 Meeting #87, R4-1807809, May 21-25, 2018, 3 pages.

* cited by examiner

METHODS FOR REFERENCE SIGNALLING, TRANSMITTER NODES AND RECEIVER NODES

The present disclosure pertains to the field of wireless communications. The present disclosure relates to methods for reference signalling, transmitter nodes and receiver nodes.

BACKGROUND

During an initial beam establishment procedure, receiver nodes (such as wireless devices, such as user equipment, UE) measure the Reference Signal Receive Power (RSRP) of reference signals (such as synchronization signal (SS) blocks, for example on Physical Broadcast channel (PBCH)). Each reference signal block corresponds to a different transmit beam (such as a transmit spatial filter) and a polarization, and may be measured several times, possibly using different receive beams (such as receive spatial filters).

Based on RSRP measurements and beam correspondence (BC, allowing the UE to determine Transmission, Tx, beam based on Reception, Rx, beam measurements or vice versa), the receiver node (such as wireless device) autonomously selects a transmit beam from the transmit node (such as a transmit spatial filter) and a receive beam at the receiver node (such as a receive spatial filter). The receiver node determines a beam-pair, for communication with a transmitter node. The transmitter node determines a beam-pair, for communication with the receiver node. A beam pair includes a single Rx beam at one node and the counter-pointing Tx beam at the opposite side. The receiver node aims at selecting the beam-pair having the largest measured RSRP.

However, only a single polarization is typically sounded or used for measurements, which is sub-optimal. For example, the SS/PBCH blocks measurements may lead to erroneous beam selection. For example, the receiver node (such as wireless device) are not capable of obtaining information (for example, making assumptions) on the spatial and/or polarization properties of the SS/PBCH blocks transmitted by the transmitter node (such as network node).

SUMMARY

For example, the receiver node (such as wireless device) cannot obtain or have information (for example, assume) that two different SS/PBCH share the same transmit beam or transmit spatial filter (e.g. substantially the same transmit beam, such as Quasi Collocated (QCL), for spatial Rx parameter: type D, QCL-D). As a result, beam selection is based on RSRP estimates produced from single-polarized reference signals (such as pilots), which can only partially capture the channel gain.

It may be assumed that the receiver node (such as wireless device, such as user equipment, UE) is capable of using dual polarized antenna ports to estimate the channel capacity. For example, when the receiver node (such as wireless device) knows that two SS/PBCH blocks are QCL-D but have orthogonal polarizations, the receiver node (such as wireless device) can combine measurements on both SS/PBCH blocks to obtain RSRP estimates based on dual-polarized reference signals (such as pilots).

Because of the advantageous properties of dual-polarized reference signals, schemes to communicate to the receiver node (such as wireless device) the spatial and polarization properties of the SS bursts may have been devised. However, such schemes lead to unnecessary use of resources (e.g. waste of resources) because all or some of the SS/PBCH blocks are retransmitted using orthogonal polarizations on separate time-frequency occasions. Furthermore, there is an additional latency associated with such schemes.

Accordingly, there is a need for nodes and methods for reference signalling, which mitigate, alleviate or address the shortcomings existing and provide an improved resource management at the transmitter node and an enhanced beam selection at the receiver node. For example, the receiver nodes are capable of observing both SS polarizations without consuming additional resources. The performance of beam selection can therefore be improved without incurring additional resources and/or latency.

Disclosed is a method performed by a transmitter node of a communication system, for transmitting reference signalling. The method comprises transmitting, to one or more receiver nodes of the communication system, a reference signal sequence using a first antenna port and a carrier frequency. The method comprises transmitting, to the one or more receiver nodes, using another antenna port and the same carrier frequency, a delayed version of the reference signal sequence. The delay is non-zero and less than a symbol duration of the communication system.

Further, a transmitter node is provided, the transmitter node comprising a memory circuitry, a processor circuitry, and a wireless interface. The transmitter node is configured to perform any of the methods disclosed herein.

The transmitter node disclosed herein and related method improve the radio resource managements while enabling an enhanced beam selection at the receiver node. It may be appreciated that the radio resource management is improved by transmitting a delayed version of the reference signal sequence using another antenna port and the same carrier frequency and with a delay that is less than a symbol duration of the communication system. This may also avoid incurring additional latency.

Disclosed is a method, performed by a receiver node of a communication system, for reference signalling. The method comprises receiving, from a transmitter node, control signalling indicative of a presence of a delayed version of a reference signal sequence on a separate antenna port of the transmitter node. The method comprises receiving, from the transmitter node, the reference signal sequence transmitted using a first antenna port of the transmitter node and a carrier frequency. The method comprises receiving, from the transmitter node, a delayed version of the reference signal sequence transmitted using another antenna port of the transmitter node and the same carrier frequency. The delay is non-zero and less than a symbol duration of the communication system.

Further, a receiver node is provided, the transmitter node comprising a memory circuitry, a processor circuitry, and a wireless interface. The receiver node is configured to perform any of the methods disclosed herein.

The receiver node disclosed herein and related method enables an enhanced beam selection, which results into a reduction of the time from initial beam establishment to the point when the system (such as receiver node and/or transmitter node) is ready to receive and/or transmit, two spatially multiplexed data streams (for example, a reduced time to MIMO (TTM) where MIMO stands for multiple input multiple output).

Also, the improved beam selection may lead to potentially higher data rates compared to beam selection based on single-polarized reference signals. Further, the receiver node disclosed herein is capable of improving the estimation of the reference signals (such as by observing two polarizations, which may be orthogonal) without consuming additional resources. Indeed, the receiver node disclosed can estimate a rank-two channel matrix.

BRIEF DESCRIPTION OF THE DRAWINGS

The above and other features and advantages of the present disclosure will become readily apparent to those skilled in the art by the following detailed description of example embodiments thereof with reference to the attached drawings, in which.

DETAILED DESCRIPTION

Figure 1A:
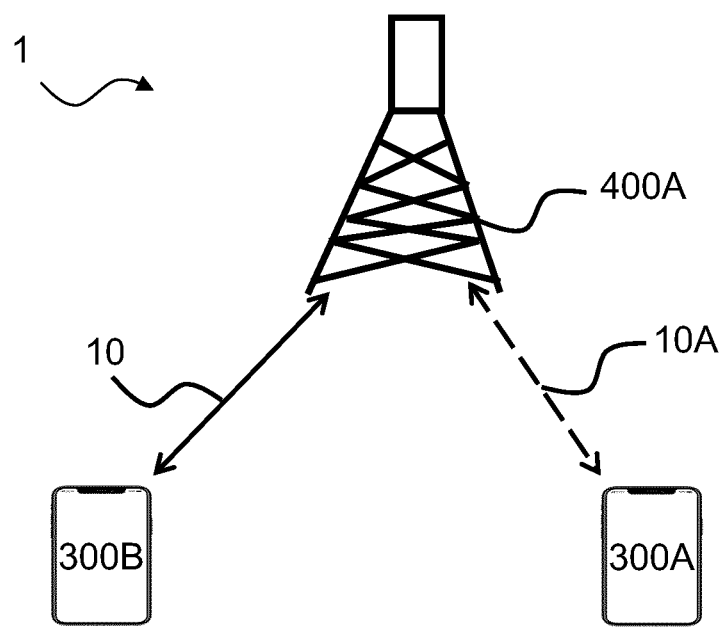
FIG. 1A is a diagram illustrating an example wireless communication system comprising an example network node and an example wireless device according to this disclosure.

Various example embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which aid understanding the disclosure, while other details have been left out. Throughout, the same reference numerals are used for identical or corresponding parts.

FIG. 1A is a diagram illustrating an example wireless communication system 1 comprising an example transmitter node as network node 400, 400A and an example receiver node as wireless device 300, 300A, 300B according to this disclosure.

As discussed in detail herein, the present disclosure relates to a wireless communication system 1 comprising a cellular system, e.g. a 3GPP (3$^{rd}$ Generation Partnership Project) wireless communication system. The wireless communication system 1 comprises a wireless device 300A and/or a network node 400A.

In one or more embodiments, the transmitter node disclosed herein may comprise a network node which may refer to a radio access network node operating in the radio access network, such as a base station, an evolved Node B, eNB, gNB. In one or more embodiments, the receiver node disclosed herein may comprise a wireless device which may refer to a mobile device and/or a user equipment, UE.

The wireless communication system 1 described herein may comprise one or more wireless devices 300A, 300B, and/or one or more network nodes 400A, such as one or more of: a base station, an eNB, a gNB and/or an access point.

The wireless device 300A, 300B may be configured to communicate with the network node 400 via a wireless link (or radio access link) 10, 10A.

The transmitter node is configured to communicate with one or more receiver nodes, such as wireless devices 300A, 300B.

The receiver node is configured to communicate with the transmitter node, such as network node 400A.

The disclosed wireless device may be configured to perform MIMO enhancements, such as for 5$^{th}$ generation New Radio, 5G-NR, e.g. operating in frequency range 2 (FR2) (for example, for 3GPP Rel. 17 and/or subsequent) and/or in frequency range 1.

It is to be noted that a rank of a radio channel (e.g. an estimation of a beam based on a narrow frequency band) is known before MIMO transmissions can be scheduled. It may be appreciated that the ability to support polarization based MIMO transmissions depends, among other factors, on the properties of the beams, such as of the currently selected beam-pair (for example, gNB beam towards the UE and the corresponding UE beam towards the gNB). Erroneous beam selection during initial access can negatively impact the TTM. Due to implementation limitations of the UE, some beams may not be able to support polarization based MIMO transmissions. Another challenge is that measurements of the supported rank which can only be conducted after the UE has reached the connected mode.

For dual polarized measurement or sounding capability, in Rel-16 specification, the polarization aspect of beams is largely overlooked and in general transparent to the operation. An approach for identification of the best performing beam-pair is based on that the receiver node is expected to receive with dual polarized antennas. This is however not a mandatory implementation for a receiver node as UE, and even when supported by the UE, this requires two receivers to be simultaneously active during e.g. an SSB-burst. A challenge with single polarized reference signals is that the channel on both polarizations is not sounded (such as estimated, and/or measured). It is therefore not possible for a UE to estimate a sufficiently accurate capacity (such as the "true" potential) of a beam-pair.

An approach may involve associating SS blocks, SSBs, that differ only in polarization. This can be done both explicitly and implicitly. However, this requires an increased number of reference signals, which in turn require additional resources, possibly resulting in a longer beam sweep duration.

An approach may involve transmitting only a few orthogonally polarized reference signals, RS (e.g. dedicated SSBs occasionally) so that a UE can select to only evaluate the strongest beam-pair candidates. This may minimize the additional overhead; however, this approach does not benefit legacy UEs.

A further approach may involve dedicated SSBs carrying RS with a combination of both polarizations, such as a linear polarization, a circular polarization, or an elliptical polarization. Adding an orthogonally polarized RS may only require minimal overhead, however, this approach does not benefit legacy UEs.

The present disclosure provides, in one or more embodiments, a technique which integrates a delayed version of a reference signal sequence into the reference signal sequence, within the symbol duration. In other words, the disclosed technique may be seen as integrating an orthogonally polarized RS into the existing RS waveform with a phase shift large enough to make it independent to the reference polarization. For a legacy UE, the added waveform may be detected as an additional tap in the delay profile and the received power may better reflect the potential channel capacity. A Rel-17 UE can further estimate the capacity with better accuracy and MIMO capability for each beam-pair.

In the present disclosure, the disclosed technique allows shortening the TTM of a receiver node. With the disclosed technique, a rank of the radio channel can be evaluated before the receiver node has reached the connected state, thereby shortening the overall TTM and at the same time enabling the receiver nodes (such as UEs) to select beam pairs based on an estimated channel capacity.

Additionally, the disclosed technique may transparently benefit legacy devices (Rel-16 or older) as the RSRP based beam selection enables detection of a power which becomes proportional to the channel capacity.

Figure 1B:
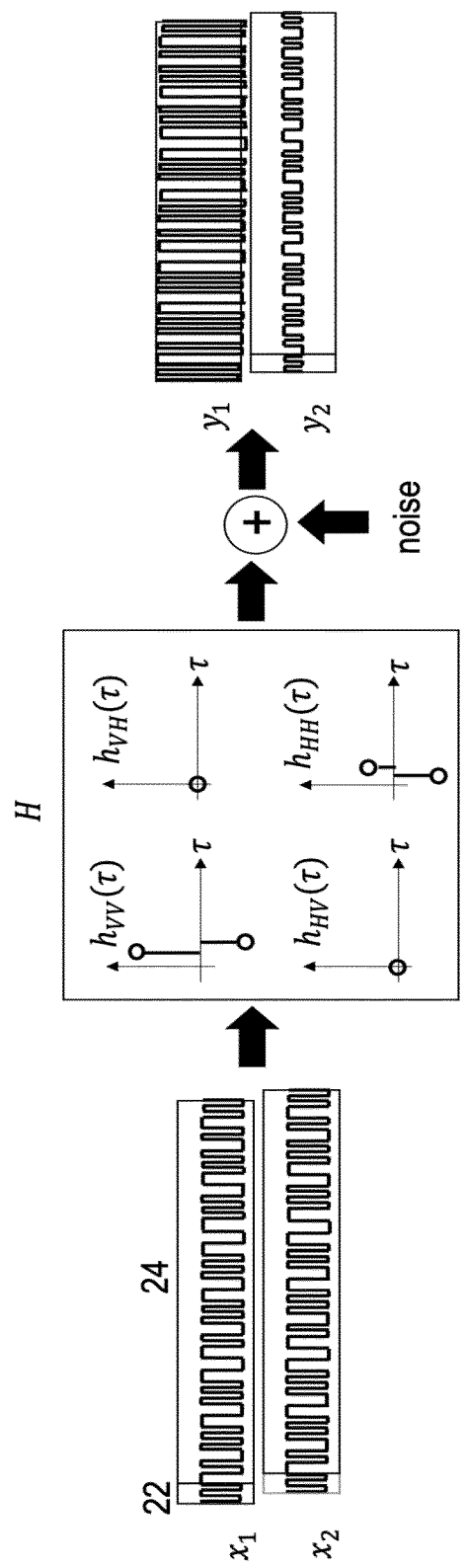
FIG. 1B is a diagram illustrating an example reference signal sequence and an example delayed version of reference signal sequence according to this disclosure.

FIG. 1B is a diagram illustrating an example reference signal sequence and an example delayed version of reference signal sequence according to this disclosure.

FIG. 1B shows a reference signal sequence $x_1$ with a cyclic prefix CP 22, and an Orthogonal Frequency Division Multiplexing, OFDM, symbol useful time 24. The reference signal sequence $x_1$ is transmitted by the transmitter node using a first antenna port and a carrier frequency.

FIG. 1B shows $x_2$ as a delayed version of the reference signal sequence $x_1$, transmitted by the transmitter node, with a delay which is non-zero and less than a symbol duration. The delayed version of the reference signal sequence $x_2$ is transmitted in this example using a different polarization. In this example, the delay is half the CP: CP/2.

The channel is denoted by H and, in the example, has negligible cross-polarization components: the $y_1$ is aligned with $x_1$, and $y_2$ with $x_2$.

It is noted that the entries of the matrix H are channel impulse responses (CIR). For example, $h_{VV}(\tau)$ is the CIR between the vertically polarized output of the channel and the vertically polarized input and has two non-zero taps. For example, $h_{VH}(\tau)$ is the CIR linking the vertically polarized output of the channel and the horizontally polarized input, and all of its taps are approximately zero. For example, $h_{HH}(\tau)$ is the CIR linking the horizontally polarized output of the channel and the horizontally polarized input and has two non-zero taps. For example, $h_{HV}(\tau)$ is the CIR linking the horizontally polarized output of the channel and the vertically polarized input, and all of its taps are approximately zero.

The received signals $y_1$ and $y_2$ at the receiver node represent the convolution of $x_1$ and $x_2$ with the channel H, plus receiver noise.

The received signal $y_2$ corresponds to the delayed version of $y_1$ where the delay is half the CP.

The reference signal sequences may be carried over dual-polarized transmissions. Receiver nodes aware of this transmission scheme can obtain full-rank estimates of the channel state. Such channel state information can be valuable during initial beam establishment e.g., (i) to improve the performance of Physical Random Access Channel, PRACH, preamble transmission, and/or (ii) to report channel rank information to the network during initial access.

In other words, the disclosed technique illustrated in this example of FIG. 1B allows receiver nodes to observe both reference signal sequences with possibly different (e.g. possibly orthogonal) polarizations without consuming additional resources. For example, no reference signal sequences need to be transmitted on separate time-frequency occasions. Additionally, the disclosed receiver nodes can estimate a rank-two channel matrix.

Figure 2:
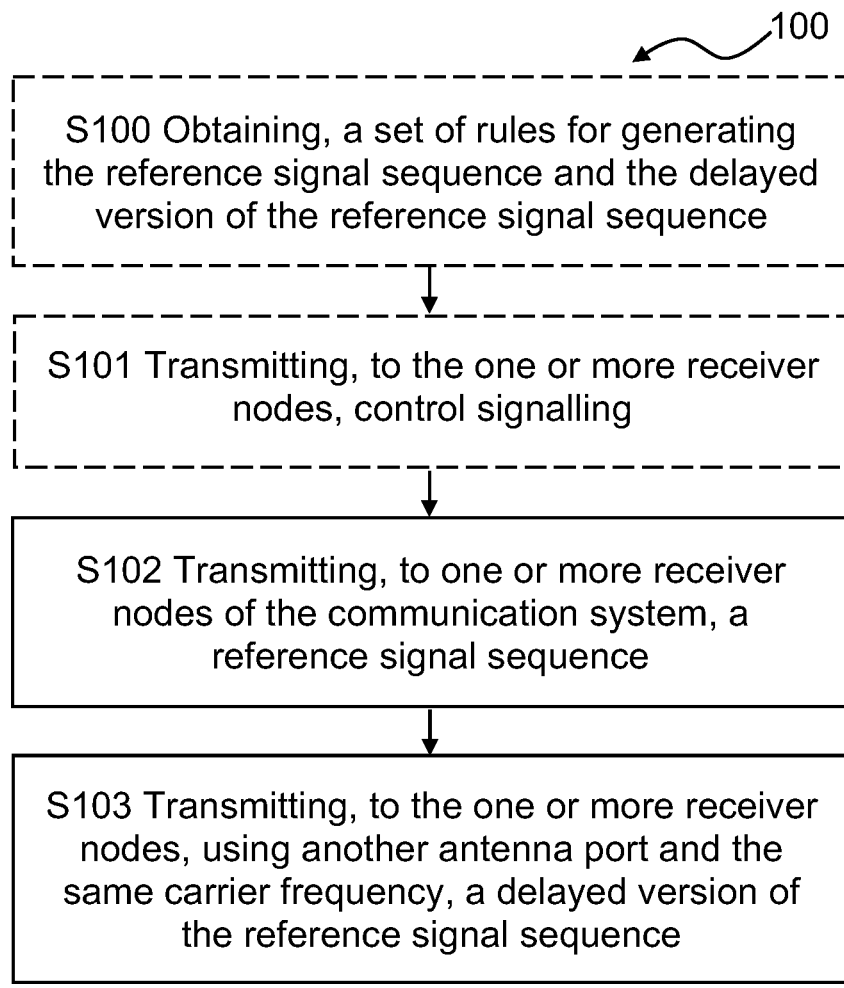
FIG. 2 is a flow-chart illustrating an example method, performed in a transmitted node, for transmitting reference signalling according to this disclosure.
Figure 4:
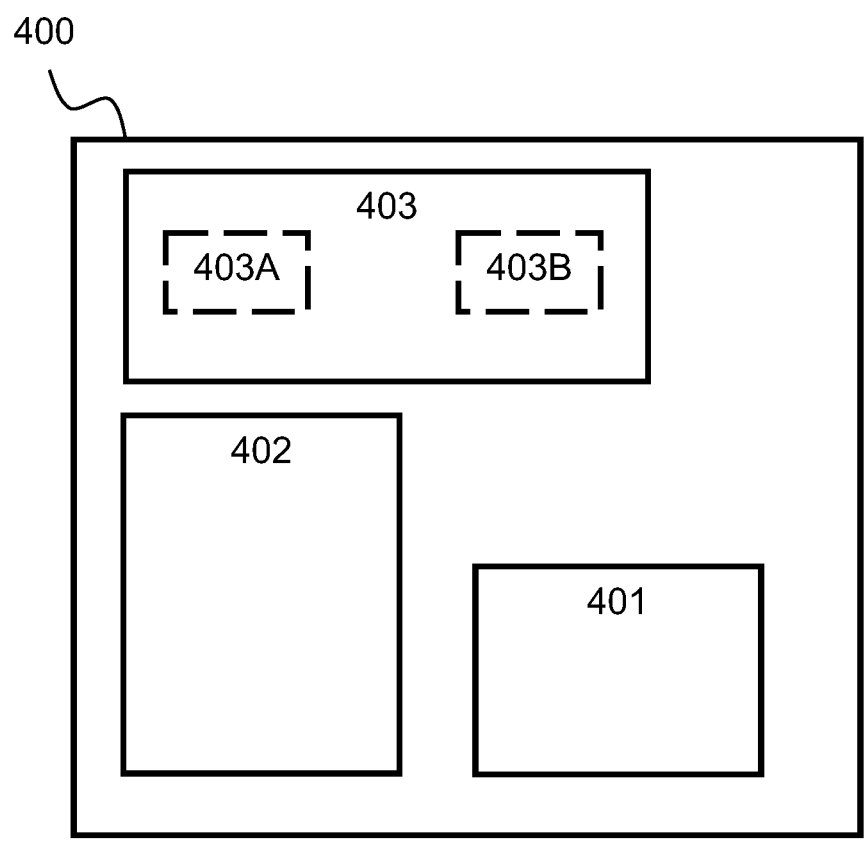
FIG. 4 is a block diagram illustrating an example transmitter node according to this disclosure.

FIG. 2 shows a flow diagram of an example method 100, performed by a transmitter node of a communication system (such as a transmitter node disclosed herein, such transmitter node 400 of FIG. 4), for transmitting reference signalling.

The method 100 comprises transmitting S102, to one or more receiver nodes of the communication system, a reference signal sequence using a first antenna port and a carrier frequency.

The reference signal sequence may refer to a sequence of reference signals. A reference signal comprises for example a synchronization signal, a pilot signal, and/or a channel sounding signal (for example carried over PBCH). A reference signal disclosed herein comprises for example reference signal (RS) of Zadoff-Chu type, and/or Gold type, and/or similar, where a cyclic shift can be applied to emulate a delay while retaining satisfactory auto-correlation properties and cross-correlation properties.

The antenna port may refer to an antenna configuration. An antenna assembly may comprise two or more collocated antennas, wherein the antenna port may be associated with one of the antennas. The antenna port may be a virtual antenna port in one or more embodiments.

The carrier frequency may refer to the frequency used to transmit the reference signal sequence. The carrier frequency may comprise for example a frequency of a sub-carrier, in e.g. an OFDM system.

The method 100 comprises transmitting S103, to the one or more receiver nodes, using another antenna port and the same carrier frequency, a delayed version of the reference signal sequence. The delay is non-zero and less than a symbol duration of the communication system. The carrier frequency used in S103 is the same as in S102. The antenna port is different than the one used in S102. In one or more embodiments, the delay is optionally non-zero.

The symbol duration can depend on the coherence time of the channel between the one or more receiver node and the transmitter node. The symbol duration can depend on the numerology used in the communication system (such as carrier spacing, sub-carrier spacing, cyclic prefix, slot duration etc.). In one or more example methods, the symbol duration comprises one or more of: a cyclic prefix, an Orthogonal Frequency Division Multiplexing, OFDM, symbol, and a Physical Random Access Channel, PRACH, preamble.

In one or more example methods, the symbol duration is a cyclic prefix. For example, the delay is non-zero and less than the cyclic prefix. In other words, the delay is upper limited to a cyclic prefix.

In one or more example methods, the symbol duration is an Orthogonal Frequency Division Multiplexing, OFDM, symbol.

In one or more example methods, the symbol duration is a Physical Random Access Channel, PRACH, preamble.

In one or more embodiments, the delay may be in range of ]0; CP[, such as in range of ]0; CP/2]. For example, the delay may be larger than 0 and less than CP, such as larger than 0 and equal or less than CP/2.

For example, the delay may be one time slot, e.g. in NR (e.g. 1000 us, 500 us, 250 us, 125 us, 62.5 us for sub-carrier spacing SCS=15 KHz, 30 KHz, 60 KHz, 120 KHz and 240 KHz, respectively). For example, the delay (e.g. cyclic shift) in this range may be used when the reference signal or pilot signal is a random-access sequence.

For example, the delay may be a symbol duration, such as one NR OFDM symbol (e.g. 66.7 us, 33.3 us, 16.7 us, 8.3 us and 4.17 us, respectively). For example, this range is to be considered when the (cyclically) delayed reference signal sequence is restricted to be within one OFDM symbol.

For example, the delay may be one cyclic prefix period (such as 4.76 us, 2.38 us, 1.19 us, 0.60 us or 0.30 us).

In other words, the delayed version of the reference signal sequence comprises a RS component, which is delayed in time. The delayed version of the reference signal sequence can be seen as a delay of the channel impulse response.

In one or more example methods, the delayed version of the reference signal is configured to be used in combination with the reference signal sequence as a basis for channel state estimation, such as to enable the receiver node to estimate a full-rank channel state.

In other embodiments, the delay is non-negative (optionally non-zero) and less than the symbol duration.

It may be appreciated that the transmissions S102 and S103 may comprise broadcasting respectively.

It may be appreciated that the transmissions S102 and S103 lead to an improved accuracy of channel estimation, such as a full or complete channel estimation, such as a full-rank channel estimation. The disclosed technique is backwards compatible and unaware devices can also benefit from the proposed transmission scheme. In particular, receiver nodes exploiting multipath diversity may significantly improve the accuracy of RSRP estimates based on measurements on the disclosed reference signal sequence and the delayed version. Receiver nodes with single-polarized receivers can also benefit from the delayed version in estimating the delayed version. Improvements in RSRP and or SINR (signal to interference plus noise ratio) estimates lead in turn to improved beam selection, and thus to reduced latency and higher data rates.

In an illustrative example where the disclosed technique is applied, the reference signal sequence of S102 (such as a SS sequence), $d_{SSS}(n)$, is defined as e.g.:

$$d_{SSS}(n) = x_0((n + m_0) \mod 127) \oplus x_1((n + m_1) \mod 127), n = 0, \ldots, 126$$

$$m_0 = 15 \left\lfloor \frac{N_{ID}^{(1)}}{112} \right\rfloor + 5N_{ID}^{(2)}, m_1 = N_{ID}^{(1)} \mod 112,$$

where the binary sequences $x_0(n)$, $x_1(n)$, n=0, ..., 126, are defined in 3GPP TS 38.211, Release 15, and $N_{ID}^{(1)}$, $N_{ID}^{(2)}$ can be derived from the physical layer cell identity, $N_{ID}^{cell}$, by $$N_{ID}^{cell} = 3N_{ID}^{(1)} + N_{ID}^{(2)}.$$

In this example, there are 1008 different cell identities, numbered from 0 to 1007. Finally, $x_{SSS}(n)$ is mapped to the sequence of symbols $d_{SSS}(0), \ldots, d_{SSS}(126)$ by $$d_{SSS}(n) = \beta_{SSS} \cdot (1 - 2 \cdot x_{SSS}(n)), n = 0, \ldots, 126,$$

and transmitted on the third OFDM symbol of each reference signal sequence (such as SS/PBCH block). The factor $\beta_{SSS}$ ensures that $d_{SSS}(n)$ is transmitted with appropriate power. The sequences $x_{SSS}(n)$ have satisfactory auto- and cross-correlation properties. A receiver node searching for the Secondary SS, SSS, within the reference signal sequence (e.g. SS/PBCH blocks) may attempt to correlate the received signals against a set of physical layer cell identities.

In the disclosed technique, $d_{SSS}(n)$ may be transmitted (e.g. broadcasted) using rank-two transmissions (for example, each layer mapped to different polarizations). A receiver node capable of receiving dual-polarized beams may receive the signal e.g.:

$$y = G \cdot H \cdot F \cdot x + w, \quad (1)$$

where x is a 2×127 signal transmitted by the transmitter node (such as gNB) and depends on $d_{SSS}(n)$, F is a 2×2 precoder representing the effect of the transmitter node (such as gNB) transmit beam, H is a 2×2 dual-polarized propagation channel including the path loss, G is the 2×2 combining filter representing the effect of the receive beam of the receiver node, and w is the 2×127 vector of receiver noise. The transmitter node (such as gNB) transforms the rank-one signal $d_{SSS}(n)$ into a rank-two signal (incorporating the delayed version of the reference signal sequence with the ("non-delayed") reference signal sequence) which may be sent on different polarizations respectively by e.g.

$$x = [x(0)x(1) \ldots x(126)] \quad (2)$$

$$x(n) = \frac{1}{\sqrt{2}} [d_{SSS}(n) d_{SSS}((n + n_0) \mod 127)]^T, n = 0, \ldots, 126.$$

In other words, the transmitter node (such as gNB) sends a version of $d_{SSS}(n)$ shifted by delay (e.g. cyclic shift) $n_0$ samples, (e.g. in a second layer). For example, $n_0$ can be set to be one half of the cyclic prefix length, CP/2. In this case, CP is about 9 samples long. The transmitter node (such as gNB) can select a precoder F=[$f_1$ $f_2$], and the receiver node can select a combiner G=[$g_1$ $g_2$]. For simplicity, we assume that F, G fulfill $$F^H F = G_{TX} \cdot I, G^H G = G_{RX} \cdot I. \quad (3)$$

(3) can normally be fulfilled by selecting beam pairs so that one operates near the boresight direction and hence represent no practical limitation. Using (2) and (3), the energy of the received signal (1) can be evaluated as e.g.:

$$\text{trace}(yy^H) = \text{trace}(GHFxx^H F^H H^H G^H) = \frac{G_{TX} G_{RX}}{2} \cdot \text{trace}(HH^H), \quad (4)$$

where, for simplicity, the effect of the noise vector w is ignored (e.g. negligible) and, furthermore, the delayed version of reference signal sequence (e.g. rank-two SS signal) x is chosen such that $xx^H = I$. It may be appreciated that $xx^H = I$ only needs to hold approximately, $$xx^H = \begin{pmatrix} 1 & \epsilon^* \\ \epsilon & 1 \end{pmatrix}$$

for some $\epsilon \ll 1$. This requirement is fulfilled by the $d_{SSS}(n)$ sequences defined above.

The channel gain in (4) can be harvested by any dual-polarized receiver nodes exploiting diversity. The disclosed technique is backwards compatible, and receiver nodes need not be aware of it. Receiver nodes aware of the delayed version can remove the delay $n_0$ to estimate the effective channel matrix $$H_{eff} = G \cdot H \cdot F \quad (5)$$

When F is known to the receiver node (e.g., pre-agreed or from signaling) the underlying channel H can be estimated.

For comparison, for the delayed version of the reference signal sequence as a rank-one reference signal sequence (e.g. rank-one SS signal), we have e.g.:

$$x=[d_{SSS}(0) \ldots d_{SSS}(126)], y=G \cdot H \cdot f x + w, \quad (6)$$

where x and f have sizes 1×127 and 2×2, respectively. The received energy is then $$\text{trace}(yy^H)=\text{trace}(GHfxx^H f H^H G^H)=\text{trace}(fHH^H f^H). \quad (7)$$

In one or more example methods, the delayed version of the reference signal sequence comprises a cyclic shift of the reference signal sequence. In other words, the delayed version of the reference signal sequence may be a cyclic shift of the reference signal sequence. For example, a delayed version of the reference signal includes a delay which is a cyclic shift, e.g. a shift repeated in a cyclic manner. For example, the delay may be a cyclic shift of the reference signal sequence. Stated differently, the delayed version of the reference signal sequence may be seen cyclically shifted or cyclically delayed with respect to the transmission of the reference signal sequence.

For example, the delayed version of the reference signal sequence can start and end at the same time as the reference signal sequence transmitted in S101, but the content of the delayed version has been altered (compared to the reference signal sequence transmitted in S101) so that the effect is a delay of the perceived channel impulse response.

In one or more embodiments, the non-zero delay is a cyclic shift. For example, a non-zero delay can be taken or implemented as a cyclic shift.

In one or more embodiments, the delay is a cyclic delay.

In one or more example methods, the method 100 comprises transmitting S101, to the one or more receiver nodes, control signalling indicative of a presence of the delayed version of the reference signal. The control signalling indicative of a presence of the delayed version of the reference signal may be transmitted explicitly and/or implicitly signalled. For example, the control signalling indicative of a presence of the delayed version of the reference signal comprises one or more control messages, and/or control indicators.

In one or more example methods, the control signalling indicative of the presence of the delayed version of a reference signal sequence is received via system information (such a System Information Block). For example, the control signalling indicative of the presence of the delayed version of a reference signal sequence can be transmitted via the system information of the serving or neighbouring cell, handover signalling during a handover procedure, and/or inter-RAT (wherein RAT stands for Radio Access Technology) or inter-band signalling in the case of dual-connectivity.

In one or more example methods, the control signalling indicative of the presence of the delayed version of a reference signal sequence comprises a flag indicating the presence of the delayed version of a reference signal sequence. For example, the flag may be a value (e.g. a release number). In one or more example methods, the control signalling indicative of the presence of the delayed version of a reference signal sequence comprises a delay parameter.

In one or more example methods, the method comprises the transmission S103 of the delayed version of the reference signal sequence is performed using a polarization different from a polarization of the reference signal sequence transmitted in S102. For example, the polarization of the delayed version transmitted in S103 may be orthogonal to the polarization of the reference signal sequence transmitted in S102. For example, each layer (such as MIMO layer) can be mapped to a different polarization. For example, the number of layers (such as MIMO layers) equals the number of simultaneous data streams that are transmitted in a MIMO system. The rank of the channel may set an upper limit to the number of layers.

In one or more example methods, the method 100 comprises obtaining S100, a set of rules for generating the reference signal sequence and the delayed version of the reference signal sequence.

In one or more example methods, the delay is longer than a time threshold. For example, the delay of the delayed version is longer than a time threshold in order to distinguish the delayed version from reflected signals. For example, the time threshold is a predefined or pre-configured time threshold or signalled by the transmitter node. For example, the delay is equal or longer than half the cyclic prefix in one or more embodiments.

Figure 3:
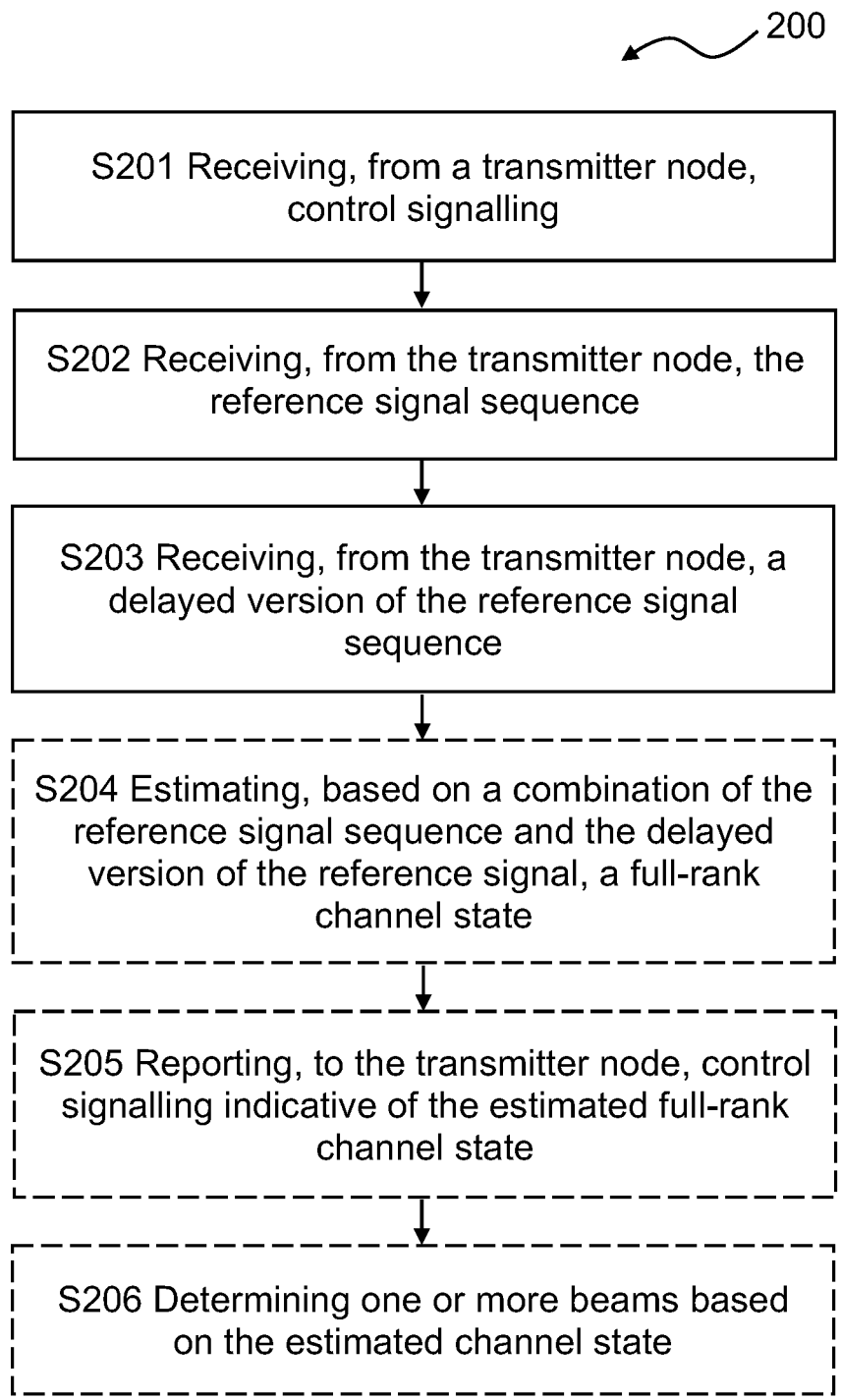
FIG. 3 is a flow-chart illustrating an example method, performed in a receiver node, for reference signalling according to this disclosure.
Figure 5:
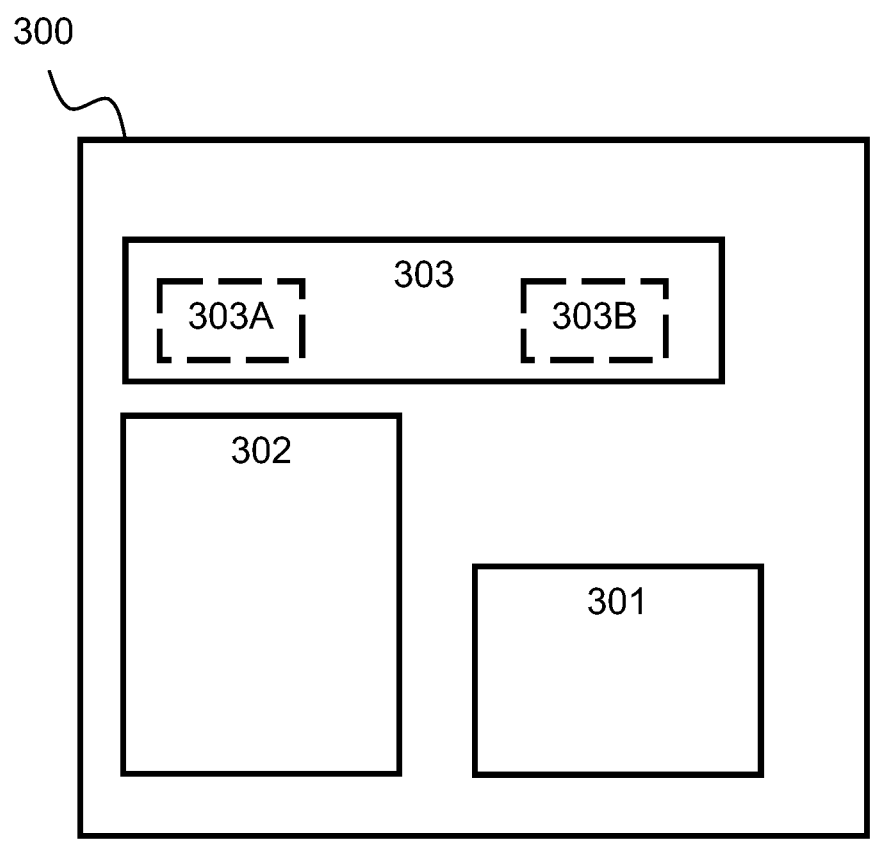
FIG. 5 is a block diagram illustrating an example receiver node according to this disclosure.

FIG. 3 shows a flow diagram of an example method 200, performed by a receiver node of a communication system (such as a receiver node disclosed herein, such as receiver node 300 of FIG. 5), for reference signalling.

The method 200 optionally comprises receiving S201, from a transmitter node, control signalling indicative of a presence of a delayed version of a reference signal sequence on a separate antenna port of the transmitter node. For example, the receiver node receives the control signalling indicative of the presence of a delayed version of a reference signal sequence on a separate antenna port of the transmitter node. The delayed version of the reference signal sequence is delayed with respect to the reference signal sequence transmitted by the transmitter node in S101 of FIG. 2.

The method 200 comprises receiving S202, from the transmitter node, the reference signal sequence transmitted using a first antenna port of the transmitter node and a carrier frequency. For example, the receiver node receives the reference signal sequence transmitted by the transmitter node in S102 of FIG. 2 using a first antenna port of the transmitter node and a carrier frequency.

The method 200 comprises receiving S203, from the transmitter node, a delayed version of the reference signal sequence transmitted using another antenna port of the transmitter node and the same carrier frequency. The delay is non-zero and less than a symbol duration of the communication system. For example, the receiver node receives the delayed version of the reference signal sequence transmitted by the transmitter node in S104 of FIG. 2 using another antenna port of the transmitter node and the same carrier frequency (e.g. same as in S202).

At the receiver node, the delayed version may be seen as a virtually delayed component with a delay (large enough to make it uncorrelated) to the original reference signal sequence (e.g. original sounding waveform). The delayed component may be orthogonally polarized with respect to the polarization of the original reference signal sequence.

In one or more embodiments, the receiver node may comprise one or more antenna ports. In one or more example methods, the receiving S202 of the reference signal sequence and/or the receiving S203 of the delayed version of the reference signal sequence are performed using a single antenna port of the receiver node. For example, the receiver node receives the reference signal sequence and the delayed version of the reference signal sequence using a single antenna port of the receiver node.

In one or more example methods, the delayed version of the reference signal sequence received in S203 has a polarization different from a polarization of the reference signal sequence received in S202. For example, the polarization of the delayed version transmitted in S203 may be orthogonal to the polarization of the reference signal sequence transmitted in S202. For example, each layer (such as MIMO layer) can be mapped to a different polarization.

In one or more example methods, the receiving S202 of the reference signal sequence and/or the receiving S203 of the delayed version of the reference signal sequence are performed using two antenna ports of the receiver node. For example, the two antenna port are separate and/or individual antenna ports. For example the receiver node receives the reference signal sequence using a first antenna port and the delayed version of the reference signal sequence using a second antenna port different and/or separate from the first antenna port.

In one or more example methods, the receiving S202 of the reference signal sequence and/or the receiving S203 of the delayed version of the reference signal sequence are performed using a single polarization at the receiver node (such as an antenna port configured for a single polarization). It may be appreciated that the receiver nodes do not need to be aware of our disclosed technique to be able to reap some of its benefits. For example, the receiver node(s) which are not aware of the disclosed technique and are capable of one polarization at a time may benefit from receiving reference signal components from both polarizations as if the receiver node(s) had an aligned polarization. This may improve estimation of the channel for the receiver nodes which are not aware of the disclosed technique.

In one or more example methods, the receiving S202 of the reference signal sequence and/or the receiving S203 of the delayed version of the reference signal sequence are performed using two polarizations at the receiver node (such as two orthogonal polarizations). For example, the receiver node may be configured to use a first antenna port with a first polarization and a second antenna port with a second polarization different than the first polarization (e.g. orthogonal to the first polarization).

In one or more example methods, the method 200 comprises estimating S204, based on a combination of the reference signal sequence and the delayed version of the reference signal, a full-rank channel state. It may be assumed that the channel is approximately constant along the subcarrier range of interest. For example, the full-rank channel state may comprise a full-rank channel matrix indicative of the channel between the receiver node and the transmitter node. In one or more embodiments, a 2×2 channel matrix estimation can be performed, having up to rank 2. For example, for each "beam/spatial filter", the receiver node may use up to two antenna ports (possibly having different polarizations) and the transmitter node may use two antenna ports. For example, there may be a 2×2 channel matrix for the channel between the receiver node and the transmitter node. The rank may be at most be 2. For example, when a receiver node (such as a UE) correlates the received delayed version with the (original) reference signal sequence, the received delayed version is detected as an independent reflection in the delay profile (e.g. a tap). For legacy UEs, the total power from all taps (e.g. the RSRP) can include contribution from both polarizations and therefore enable a better estimate of the actual channel capacity. For UEs aware of the disclosed feature, the orthogonally polarized signal can be analysed and capacity can be estimated in full rank.

The estimation of S204 may be performed using any of the equations (3), (4), and (5) of this disclosure.

The estimation of S204 may be performed based on RSRP and/or SINR.

This may lead to improving the estimation of the channel gain based on the reference signal sequences (such as SS/PBCH blocks), which allows up to rank-two estimates of the radio channel (possibly in two polarizations). The delayed version of the reference signal sequence and the original reference signal sequences may be advantageously sent using transmissions with dual polarizations, and enabling rank-2 estimations.

In one or more example methods, the method 200 comprises reporting S205, to the transmitter node, control signalling indicative of the estimated full-rank channel state in response to S203.

In one or more example methods, the method 200 comprises determining S206 one or more beams based on the estimated channel state associated with the reference signal sequence. Receiver nodes can obtain an improved estimate of the channel gain. In doing so, the risk of erroneous beam selection is reduced. Receiver nodes in the network may benefit from the disclosed technique regardless of whether they are notified or not. Receiver nodes which are notified can additionally obtain full-rank estimates of the radio channel, which can be used to reduce the overall time to establish a MIMO link.

In one or more example methods, the symbol duration comprises one or more of: a cyclic prefix, an Orthogonal Frequency Division Multiplexing, OFDM, symbol, and a Physical Random Access Channel, PRACH, preamble.

In one or more example methods, the control signalling indicative of the presence of the delayed version of a reference signal sequence is received via system information.

In one or more example methods, the control signalling indicative of the presence of the delayed version of a reference signal sequence comprises a flag indicating the presence of the delayed version of a reference signal sequence.

In one or more example methods, the control signalling indicative of the presence of the delayed version of a reference signal sequence comprises a delay parameter.

FIG. 4 shows a block diagram of an example transmitter node 400 according to the disclosure. The transmitter node 400 comprises a memory circuitry 401, a processor circuitry 402, and a wireless interface 403. The transmitter node 400 may be configured to perform any of the methods disclosed in FIG. 2.

The wireless interface 403 comprises two antenna ports: a first antenna port 403A and another antenna port 403B (e.g. a second antenna port). The wireless interface 403 is configured for wireless communications via a wireless communication system, such as a 3GPP system, such as a 3GPP system supporting New Radio, NR.

The transmitter node 400 is configured to transmit (such as via the wireless interface 403) to one or more receiver nodes of the communication system, such as the receiver node disclosed herein, a reference signal sequence using a first antenna port and a carrier frequency.

The transmitter node 400 is configured to transmit (such as via the wireless interface 403), to the one or more receiver nodes, using another antenna port and the same carrier frequency, a delayed version of the reference signal sequence, wherein the delay is non-zero and less than a symbol duration of the communication system.

In one or more example transmitter nodes, the delayed version of the reference signal sequence comprises a cyclic shift of the reference signal sequence.

In one or more example transmitter nodes, the transmitter node 400 is configured to transmit the delayed version of the reference signal sequence using a polarization different from a polarization of the reference signal sequence.

In one or more example transmitter nodes, the delay is longer than a time threshold.

In one or more example transmitter nodes, the symbol duration comprises one or more of a cyclic prefix, an Orthogonal Frequency Division Multiplexing, OFDM, symbol, and a Physical Random Access Channel, PRACH, preamble.

The transmitter node 400 is configured to communicate with one or more receiver nodes, such as the receiver node disclosed herein, using a wireless communication system.

The transmitter node 400 is optionally configured to perform any of the operations disclosed in FIG. 2 (such as any one or more of S100, S101 of FIG. 2). The operations of the transmitter node 400 may be embodied in the form of executable logic routines (such as, lines of code, software programs, etc.) that are stored on a non-transitory computer readable medium (such as, the memory circuitry 401) and are executed by the processor circuitry 402.

Furthermore, the operations of the transmitter node 400 may be considered a method that the transmitter node 400 is configured to carry out. Also, while the described functions and operations may be implemented in software, such functionality may as well be carried out via dedicated hardware or firmware, or some combination of hardware, firmware and/or software.

The memory circuitry 401 may be one or more of a buffer, a flash memory, a hard drive, a removable media, a volatile memory, a non-volatile memory, a random access memory (RAM), or other suitable device. In a typical arrangement, the memory circuitry 401 may include a non-volatile memory for long term data storage and a volatile memory that functions as system memory for the processor circuitry 402. The memory circuitry 401 may exchange data with the processor circuitry 402 over a data bus. Control lines and an address bus between the memory circuitry 401 and the processor circuitry 402 also may be present (not shown in FIG. 4). The memory circuitry 401 is considered a non-transitory computer readable medium.

The memory circuitry 401 may be configured to store a delay parameter in a part of the memory.

FIG. 5 shows a block diagram of an example receiver node 300 according to the disclosure. The receiver node 300 comprises a memory circuitry 301, a processor circuitry 302, and a wireless interface 303. The receiver node 300 is configured to perform any of the methods disclosed in FIG. 3.

The wireless interface 303 is configured for wireless communications via a wireless communication system, such as a 3GPP system, such as a 3GPP system supporting 5G NR. The wireless interface 303 optionally comprises one antenna port 303A. In one or more embodiments, the wireless interface 303 optionally comprises two antenna port: a first antenna port 303A and a second antenna port 303B.

The receiver node 300 may be configured to receive (such as via the wireless interface 303) from a transmitter node, such as the transmitter node disclosed herein, control signalling indicative of a presence of a delayed version of a reference signal sequence on a separate antenna port of the transmitter node.

The receiver node 300 is configured to receive (such as via the wireless interface 303) from the transmitter node, such as the transmitter node disclosed herein, the reference signal sequence transmitted using a first antenna port of the transmitter node and a carrier frequency.

The receiver node 300 is configured to receive (such as via the wireless interface 303) from the transmitter node, such as the transmitter node disclosed herein, a delayed version of the reference signal sequence transmitted using another antenna port of the transmitter node and the same carrier frequency, wherein the delay is non-zero and less than a symbol duration of the communication system.

In one or more example receiver nodes, the receiver node 300 is configured to receive the reference signal sequence and/or to receive the delayed version of the reference signal sequence using a single antenna port of the receiver node.

In one or more example receiver nodes, the delayed version of the reference signal sequence has a polarization different from a polarization of the reference signal sequence.

In one or more example receiver nodes, the receiver node 300 is configured to receive the reference signal sequence and/or to receive the delayed version of the reference signal sequence using two antenna ports of the receiver node.

In one or more example receiver nodes, the receiver node 300 is configured to receive the reference signal sequence and/or to receive the delayed version of the reference signal sequence using a single polarization or two polarizations at the receiver node.

In one or more example receiver nodes, the symbol duration comprises one or more of a cyclic prefix, an Orthogonal Frequency Division Multiplexing, OFDM, symbol, and a Physical Random Access Channel, PRACH, preamble.

In one or more example receiver nodes, the control signalling indicative of the presence of the delayed version of a reference signal sequence is received via system information.

In one or more example receiver nodes, the control signalling indicative of the presence of the delayed version of a reference signal sequence comprises a flag indicating the presence of the delayed version of a reference signal sequence.

In one or more example receiver nodes, the control signalling indicative of the presence of the delayed version of a reference signal sequence comprises a delay parameter.

The processor circuitry 302 is optionally configured to perform any of the operations disclosed in FIG. 3 (such as any one or more of S204, S205, S206). The operations of the receiver node 300 may be embodied in the form of executable logic routines (such as, lines of code, software programs, etc.) that are stored on a non-transitory computer readable medium (such as, the memory circuitry 301) and are executed by the processor circuitry 302).

Furthermore, the operations of the receiver node 300 may be considered a method that the receiver node 300 is configured to carry out. Also, while the described functions and operations may be implemented in software, such functionality may as well be carried out via dedicated hardware or firmware, or some combination of hardware, firmware and/or software.

The memory circuitry 301 may be one or more of a buffer, a flash memory, a hard drive, a removable media, a volatile memory, a non-volatile memory, a random access memory (RAM), or other suitable device. In a typical arrangement, the memory circuitry 301 may include a non-volatile memory for long term data storage and a volatile memory that functions as system memory for the processor circuitry 302. The memory circuitry 301 may exchange data with the processor circuitry 302 over a data bus. Control lines and an address bus between the memory circuitry 301 and the processor circuitry 302 also may be present (not shown in FIG. 5). The memory circuitry 301 is considered a non-transitory computer readable medium.

The memory circuitry 301 may be configured to store beam pair information in a part of the memory.

Embodiments of methods and products (transmitter node and receiver node) according to the disclosure are set out in the following items:

Item 1. A method, performed by a transmitter node of a communication system, for transmitting reference signalling, the method comprising:
  transmitting (S102), to one or more receiver nodes of the communication system, a reference signal sequence using a first antenna port and a carrier frequency,
  transmitting (S103), to the one or more receiver nodes, using another antenna port and the same carrier frequency, a delayed version of the reference signal sequence, wherein the delay is non-zero and less than a symbol duration of the communication system.

Item 2. The method according to item 1, wherein the delayed version of the reference signal sequence comprises a cyclic shift of the reference signal sequence.

Item 3. The method according to any of the previous items, the method comprising:
  transmitting (S101), to the one or more receiver nodes, control signalling indicative of a presence of the delayed version of the reference signal.

Item 4. The method according to any of the previous items, wherein the transmission (S103) of the delayed version of the reference signal sequence is performed using a polarization different from a polarization of the reference signal sequence transmitted in (S102).

Item 5. The method according to any of the previous items, the method comprising:
  obtaining (S100), a set of rules for generating the reference signal sequence and the delayed version of the reference signal sequence.

Item 6. The method according to any of the previous items, wherein the delay is longer than a time threshold.

Item 7. The method according to any of items 1-6, wherein the symbol duration comprises one or more of: a cyclic prefix, an Orthogonal Frequency Division Multiplexing, OFDM, symbol, and a Physical Random Access Channel, PRACH, preamble.

Item 8. A method, performed by a receiver node of a communication system, for reference signalling, the method comprising:
  receiving (S201), from a transmitter node, control signalling indicative of a presence of a delayed version of a reference signal sequence on a separate antenna port of the transmitter node,
  receiving (S202), from the transmitter node, the reference signal sequence transmitted using a first antenna port of the transmitter node and a carrier frequency; and
  receiving (S203), from the transmitter node, a delayed version of the reference signal sequence transmitted using another antenna port of the transmitter node and the same carrier frequency, wherein the delay is non-zero and less than a symbol duration of the communication system.

Item 9. The method according to item 8, wherein the receiving (S202) of the reference signal sequence and the receiving (S203) of the delayed version of the reference signal sequence are performed using a single antenna port of the receiver node.

Item 10. The method according to any of items 8-9, where the delayed version of the reference signal sequence received in (S203) has a polarization different from a polarization of the reference signal sequence received in (S202).

Item 11. The method according to any of items 8 and 10, wherein the receiving (S202) of the reference signal sequence and/or the receiving (S203) of the delayed version of the reference signal sequence are performed using two antenna ports of the receiver node.

Item 12. The method according to any of items 8-11, wherein the receiving (S202) of the reference signal sequence and/or the receiving (S203) of the delayed version of the reference signal sequence are performed using a single polarization or two polarizations at the receiver node.

Item 13. The method according to any of items 8, and 10-12, the method comprising:
  estimating (S204), based on a combination of the reference signal sequence and the delayed version of the reference signal, a full-rank channel state.

Item 14. The method according to any of items 8, and 10-13, the method comprising:
  reporting (S205), to the transmitter node, control signalling indicative of the estimated full-rank channel state in response to S203.

Item 15. The method according to any of items 13-14, the method comprising:
  determining (S206) one or more beams based on the estimated channel state associated with the reference signal sequence.

Item 16. The method according to any of items 8-15, wherein the symbol duration comprises one or more of: a cyclic prefix, an Orthogonal Frequency Division Multiplexing, OFDM, symbol, and a Physical Random Access Channel, PRACH, preamble.

Item 17. The method according to any of the previous items, wherein the control signalling indicative of the presence of the delayed version of a reference signal sequence is received via system information.

Item 18. The method according to any of the previous items, wherein the control signalling indicative of the presence of the delayed version of a reference signal sequence comprises a flag indicating the presence of the delayed version of a reference signal sequence.

Item 19. The method according to any of the previous items, wherein the control signalling indicative of the presence of the delayed version of a reference signal sequence comprises a delay parameter.

Item 20. A transmitter node comprising a memory circuitry, a processor circuitry, and a wireless interface, wherein the transmitter node is configured to perform any of the methods according to any of items 1-7 and 17-19.

Item 21. A receiver node comprising a memory circuitry, a processor circuitry, and a wireless interface, wherein the receiver node is configured to perform any of the methods according to any of items 8-19.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1A-5 comprises some circuitries or operations which are illustrated with a solid line and some circuitries or operations which are illustrated with a dashed line. The circuitries or operations which are comprised in a solid line are circuitries or operations which are comprised in the broadest example embodiment. The circuitries or operations which are comprised in a dashed line are example embodiments which may be comprised in, or a part of, or are further circuitries or operations which may be taken in addition to the circuitries or operations of the solid line example embodiments. It should be appreciated that these operations need not be performed in order presented.

Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the example embodiments may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly to be regarded in an illustrative rather than restrictive sense. The claimed disclosure is intended to cover all alternatives, modifications, and equivalents.

The invention claimed is:

1. A method, performed by a transmitter node of a communication system, for transmitting reference signalling, the method comprising:
    transmitting, to one or more receiver nodes of the communication system, a reference signal sequence using a first antenna port and a carrier frequency; and
    transmitting, to the one or more receiver nodes, using another antenna port and the same carrier frequency, a delayed version of the reference signal sequence, wherein the delay is non-zero, less than a symbol duration of the communication system, and is orthogonally polarized with a phase shift large enough to make the delayed version of the reference signal sequence independent to a polarization of the reference signal sequence.

2. The method according to claim 1, wherein the delayed version of the reference signal sequence comprises a cyclic shift of the reference signal sequence.

3. The method according to claim 1, the method comprising:
    transmitting, to the one or more receiver nodes, control signalling indicative of a presence of the delayed version of the reference signal.

4. The method according to claim 1, wherein the transmission of the delayed version of the reference signal sequence is performed using a polarization different from a polarization of the reference signal sequence transmitted in.

5. The method according to claim 1, the method comprising: obtaining a set of rules for generating the reference signal sequence and the delayed version of the reference signal sequence.

6. The method according to claim 1, wherein the delay is longer than a time threshold.

7. The method according to claim 1, wherein the symbol duration comprises one or more of: a cyclic prefix, an Orthogonal Frequency Division Multiplexing, OFDM, symbol, and a Physical Random Access Channel, PRACH, preamble.

8. The method according to claim 1, wherein the control signalling indicative of the presence of the delayed version of a reference signal sequence is received via system information.

9. The method according to claim 1, wherein the control signalling indicative of the presence of the delayed version of a reference signal sequence comprises a flag indicating the presence of the delayed version of a reference signal sequence.

10. The method according to claim 1, wherein the control signalling indicative of the presence of the delayed version of a reference signal sequence comprises a delay parameter.

11. A transmitter node comprising a memory circuitry, a processor circuitry, and a wireless interface, wherein the transmitter node is configured to perform the method of claim 1.

12. A method, performed by a receiver node of a communication system, for reference signalling, the method comprising:
    receiving, from a transmitter node, control signalling indicative of a presence of a delayed version of a reference signal sequence on a separate antenna port of the transmitter node;
    receiving, from the transmitter node, the reference signal sequence transmitted using a first antenna port of the transmitter node and a carrier frequency; and receiving, from the transmitter node, a delayed version of the reference signal sequence transmitted using another antenna port of the transmitter node and the same carrier frequency, wherein the delay is non-zero, less than a symbol duration of the communication system, and is orthogonally polarized with a phase shift large enough to make the delayed version of the reference signal sequence independent to a polarization of the reference signal sequence.

13. The method according to claim 12, wherein the receiving of the reference signal sequence and the receiving of the delayed version of the reference signal sequence are performed using a single antenna port of the receiver node.

14. The method according to claim 12, where the delayed version of the reference signal sequence received in has a polarization different from a polarization of the reference signal sequence received in.

15. The method according to claim 12, wherein the receiving of the reference signal sequence and/or the receiving of the delayed version of the reference signal sequence are performed using two antenna ports of the receiver node.

16. The method according to claim 12, wherein the receiving of the reference signal sequence and/or the receiving of the delayed version of the reference signal sequence are performed using a single polarization or two polarizations at the receiver node.

17. The method according to claim 12, the method comprising:
estimating, based on a combination of the reference signal sequence and the delayed version of the reference signal, a full-rank channel state.

18. The method according to claim 12, the method comprising: reporting, to the transmitter node, control signalling indicative of the estimated full-rank channel state in response to S203.

19. The method according to claim 17, the method comprising: determining one or more beams based on the estimated channel state associated with the reference signal sequence.

20. The method according to claim 12, wherein the symbol duration comprises one or more of: a cyclic prefix, an Orthogonal Frequency Division Multiplexing, OFDM, symbol, and a Physical Random Access Channel, PRACH, preamble.

* * * * *